United States Patent

Jones

Patent Number: 5,923,244

Date of Patent: *Jul. 13, 1999

[54] METHOD OF DETECTING A DEFLATED TIRE ON A VEHICLE

[75] Inventor: David Jones, Lichfield, United Kingdom

[73] Assignee: Sumitomo Rubber Industries Limited, Hyogo, Japan

[*] Notice: This patent is subject to a terminal disclaimer.

[21] Appl. No.: 08/040,449

[22] Filed: Apr. 1, 1993

[30] Foreign Application Priority Data

Apr. 2, 1992 [GB] United Kingdom .................. 9207271

[51] Int. Cl.⁶ .................................................. B60C 23/00
[52] U.S. Cl. ........................ 340/442; 340/444; 73/146.5
[58] Field of Search .................................. 340/442, 444; 73/146

[56] References Cited

U.S. PATENT DOCUMENTS 4,876,528  10/1989  Walker et al. ........................... 340/444
5,248,957   9/1993  Walker et al. ........................... 340/444

*Primary Examiner*—Jeffery A. Hofsass
*Assistant Examiner*—Daryl C. Pope
*Attorney, Agent, or Firm*—Birch, Stewart, Kolasch & Birch, LLP

[57] ABSTRACT

A method of detecting a deflated tire on a vehicle by rotating each tire of the vehicle, providing one wheel speed sensor for each of the tires, detecting the angular velocity speed of the tires by the wheel speed sensors, comparing the rolling radii of the tires by means of comparing angular velocity speed signals from wheel speed sensors characterized by calculating an error value (DEL') where $$DEL'=[(C1+C4)/2-(C2+C3)/2]\times 100/(C1+C2+C3+C4)/4$$

where C1, C2, C3 and C4 are angular velocity values for left-hand front, right-hand front, left-hand rear, and right-hand rear wheels of the vehicle respectively, determining a correction factor (LAT), calculating a corrected error value (DEL) where $$DEL=DEL'-LAT\times A$$

wherein A is a vehicle related constant, and operating a tire warning indicator provided in the vehicle to indicate that at least one tire is deflated when the magnitude of the corrected error value (DEL) is sensed in the range of 0.05 to 0.5.

17 Claims, 3 Drawing Sheets

METHOD OF DETECTING A DEFLATED TIRE ON A VEHICLE

This invention relates to a method of detecting a deflated tire on a vehicle suitable for cars, trucks or the like.

BACKGROUND OF THE INVENTION

Prior applications such as French Patent Publication No 2568519 and European Patent Publication No 291 217 propose using wheel speed signals from the vehicle wheels such as for example the signals from an anti-lock braking system which are multi-pulse signals of typically 48 to 96 pulses per revolution of each wheel. The prior art system compares the speed derived signals in various ways, and also attempt to overcome errors due to vehicle factors such as cornering, braking, accelerating, uneven or changing loads, which can cause changes in the speed signals which are larger than those caused by a tire deflation of for example 0.4 bar.

French Patent Publication 2568519 avoided errors of this typo by monitoring the speeds of the diagonally opposed pairs of wheels for a long time or distance period so that it averaged out effectively cornering of the vehicle. The result however was that the device operated very slowly taking many Kilometers to sense a pressure loss.

European Patent Publication No 291 217 improved the situation by calculating the lateral and longitudinal acceleration of the vehicle using the same four wheel speed signals and setting fixed limits above which the detection system was inhibited to avoid false signals due to cornering and acceleration. This inhibition of detection however meant that for a proportion of the time of vehicle running the system was not sensing punctures, the actual proportion depending upon the type of roads and the way the vehicle was being driven.

The real difficulty with these types of systems is that, apart from the lateral acceleration of the vehicle which occurs during cornering causing increased deflection of the outer pair of wheels compared to the inner pair of wheels, each vehicle has different characteristics due to the position of the centre of gravity and the type of suspension and these different characteristics when cornering produce additional deflections in the outer pairs of tires with regard to the inner pairs of tires.

The vehicle characteristics make the deflections different in each of the tires. Similar problems occur due to vehicle characteristics in the deflections in the front pair of tires compared to the rear pair when the vehicle brakes, and vice-versa when the vehicle accelerates.

SUMMARY OF THE INVENTION

It is an object of the present invention to provide a method of detecting a deflated tire on a vehicle which accommodates the above changes, avoiding false signals and detecting deflation for substantially all the time when the vehicle is running.

According to one aspect of the present invention there is provided a method of detecting a deflated tire on a vehicle by comparing the rolling radii of the tires by means of comparing angular velocity speed signals from wheel speed sensors one at each wheel characterized by calculating an error value DEL' where $$DEL' = \frac{[(C1+C4)/2 - (C2+C3)/2] \times 100}{(C1+C2+C3+C4)/4}$$

where C1, C2, C3 and C4 are angular velocity values for left-hand front, right-hand front, left-hand rear and right-hand rear wheels of the vehicle respectively, determining a correction factor LAT, calculating a corrected error value DEL where $$DEL = DEL' - LAT \times A$$

wherein A in a vehicle related constant, and operating a tire warning indicator provided in the vehicle to indicate that at least one tire is deflated when it is sensed that the magnitude of the corrected error value DEL is in the range 0.05 to 0.5.

Preferably the tire warning indicator is operated when the magnitude of the corrected error value is in the range 0.1 to 0.3.

The vehicle related constant preferably has a value in the range $-2.0E-7$ to $+2.0E-7$.

The correction factor LAT may be selected by calculating from the four angular velocity values C1, C2, C3 and C4 respective first, second, third and fourth deciding factors (MC1, MC2, MC3, MC4) where $$MC1 = C1$$

$$MC2 = C2/[(C2+C4)/(C1+C3)]$$

$$MC3 = C3/[(C3+C4)/(C1+C2)]$$

$$MC4 = C4/[[(C2+C4)/(C1+C3)] \times [(C3+C4)/(C1+C2)]]$$

summing the four deciding factors and multiplying this sum by a centralising constant (K) to give a central deciding factor (MPSD) and selecting the correction factor (LAT) as follows, if the first or second deciding factor (MC1 or MC2) is greater than the central deciding factor (MPSD) then $$LAT = 2 \times (C3-C4) \times (C1+C2+C3+C4),$$

if the third or fourth deciding factor (MC3 or MC4) is greater than the central deciding factor (MPSD) then $$LAT = 2 \times (C1-C2) \times (C1+C2+C3+C4),$$

or if none of the deciding factors (MC1, MC2, MC3 or MC4) is greater than the central deciding factor (MPSD) then $$LAT = (C1+C3-C2-C4) \times (C1+C2+C3+C4).$$

The centralising constant used in the derivation of the central deciding factor MPSD may be in the range of 0.230125 to 0.250625 and preferably has a value of 0.25025.

The particular tire which is deflated may be detected by calculating for each wheel a deflation indicating factor IMC1, IMC2, IMC3 and IMC4, respectively, and then selecting the factor having the largest numerical value, the deflation indicating factors being calculated as follows:

$$IMC1 = C1$$

if the first deciding factor (MC1) is greater than the central deciding factor (MPSD) then $$IMC2 = C2/[((C4/C3)/2)+0.5]$$

$$IMC3 = C3/[((C4/C2)/2)+0.5]$$

$$IMC4=C4/[[((C4/C3)/2)+0.5]\times[((C4/C2)/2)+0.5]];$$

if the second deciding factor (MC2) is greater than the central deciding factor (MPSD) then $$IMC2=C2/[((C4/C3)/2)+0.5]$$

$$IMC3=C3/[((C3/C1)/2+0.5]$$

$$IMC4=C4/[[((C4/C3)/2)+0.5]\times[((C3/C1)/2+0.5)]];$$

if the third deciding factor (MC3) is greater than the central deciding factor (MPSD) then $$IMC2=C2/[((C2/C1)/2)+0.5]$$

$$IMC3=C3/[((C4/C2)/2)+0.5]$$

$$IMC4=C4/[[((C2/C1)/2)+0.5]\times[((C4/C2)/2)+0.5]];$$

if the fourth deciding factor (MC4) is greater than the central deciding factor (MPSD) then $$IMC2=C2/[((C2/C1)/2)+0.5]$$

$$IMC3=C3/[((C3/C1)/2)+0.5]$$

$$IMC4=C4/[[((C2/C1)/2)+0.5]\times[((C3/C1)/2)+0.5]];$$

or if none of the deciding factors (MC1, MC2, MC3, MC4) is greater than the central deciding (MPSD) factor then $$IMC2=C2/[((C2+C4)/(C1+C3))/2+0.5]$$

$$IMC3=C3/[(((C3+C4)/(C1+C2))/2+0.5]$$

$$IMC4=C4/[[((C3+C4)/(C1+C2))/2)+0.5]\times[((C2+C4)/C1+C3))/2+0.5]].$$

While the invention in fact compares the angular velocities of the wheels it should be understood that this can be done by comparing the times for one full turn of each wheel or by comparing digital signals for multipulse wheel speed generators.

To allow for tires from different manufacturers which may therefore be of different sizes, an initialisation procedure may be carried out. This monitors the signals under normal driving conditions and enables constants for each wheel to be determined to allow for variations.

BRIEF DESCRIPTION OF THE DRAWINGS

Further aspects of the present invention will become apparent from the following description, by way of example only, of one embodiment in conjunction with the attached diagrammatic drawings in which.

DETAILED DESCRIPTION OF THE INVENTION

Figure 1:
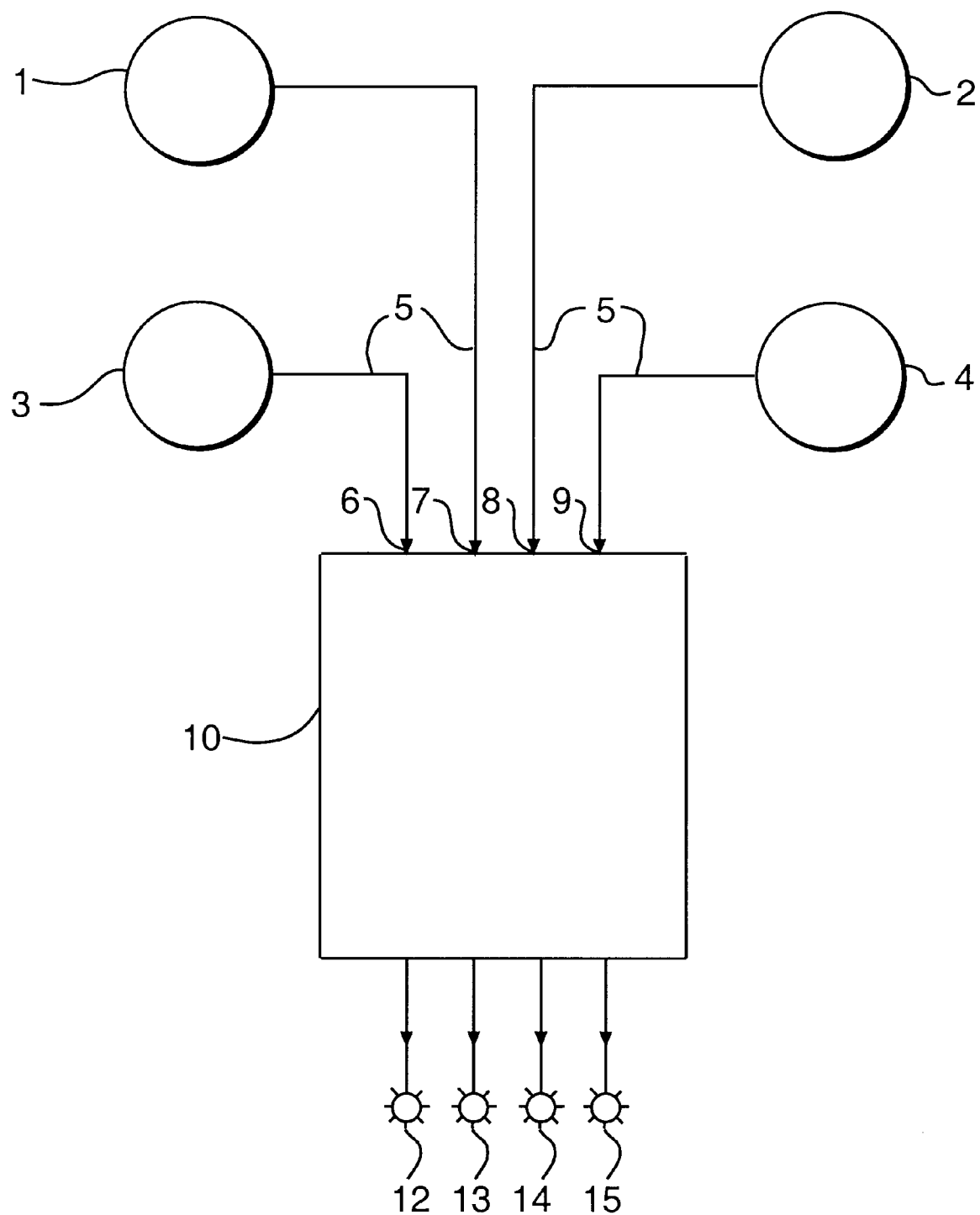
FIG. 1 is a schematic diagram showing a deflation warning device for a car having four wheels.

The apparatus shown in FIG. 1 provides a deflation warning device for a vehicle having four wheels 1, 2, 3 and 4. Wheels 1 and 2 are the left- and right-hand front wheels, respectively, and wheels 3 and 4 arm the left- and right-hand rear wheels, respectively. Each wheel has a toothed wheel device associated with it of the type designed and fitted to provide a digital signal comprising a magnetic pick-up of the type used in the anti-skid system of the electronic type—often commonly known as ABS braking system. Each pick-up is additionally connected in this case to a deflation warning detection system which uses the same digital signal as the ABS system.

The electronic signals from each of the four wheels are carried through cables 5 to four separate inputs 6, 7, 8 and 9 of a central processing unit 10. Four separate indicator lights 12, 13, 14 and 15 are provided one for each wheel 1, 2, 3 and 4. These indicator lights may be most conveniently mounted on the vehicle dashboard.

The central processing unit 10 is basically a microprocessor which monitors the four signals and compares them to determine if an outward signal is to be sent to operate an indicator light to warn of a deflated tire. In the case where the vehicle already has an ABS system fitted then the microprocessor 10 may be the same microprocessor as the ABS system. Alternatively, a separate microprocessor may be provided.

The respective values of the total digital pulse signals from each of the wheels 1, 2, 3 and 4 in a five second period are C1, C2, C3 and C4, respectively. The central processing unit 10 computes these frequency values as will be described below to determine whether or not to send a deflation warning signal to one of the warning lights 12, 13, 14 or 15.

Figure 2:
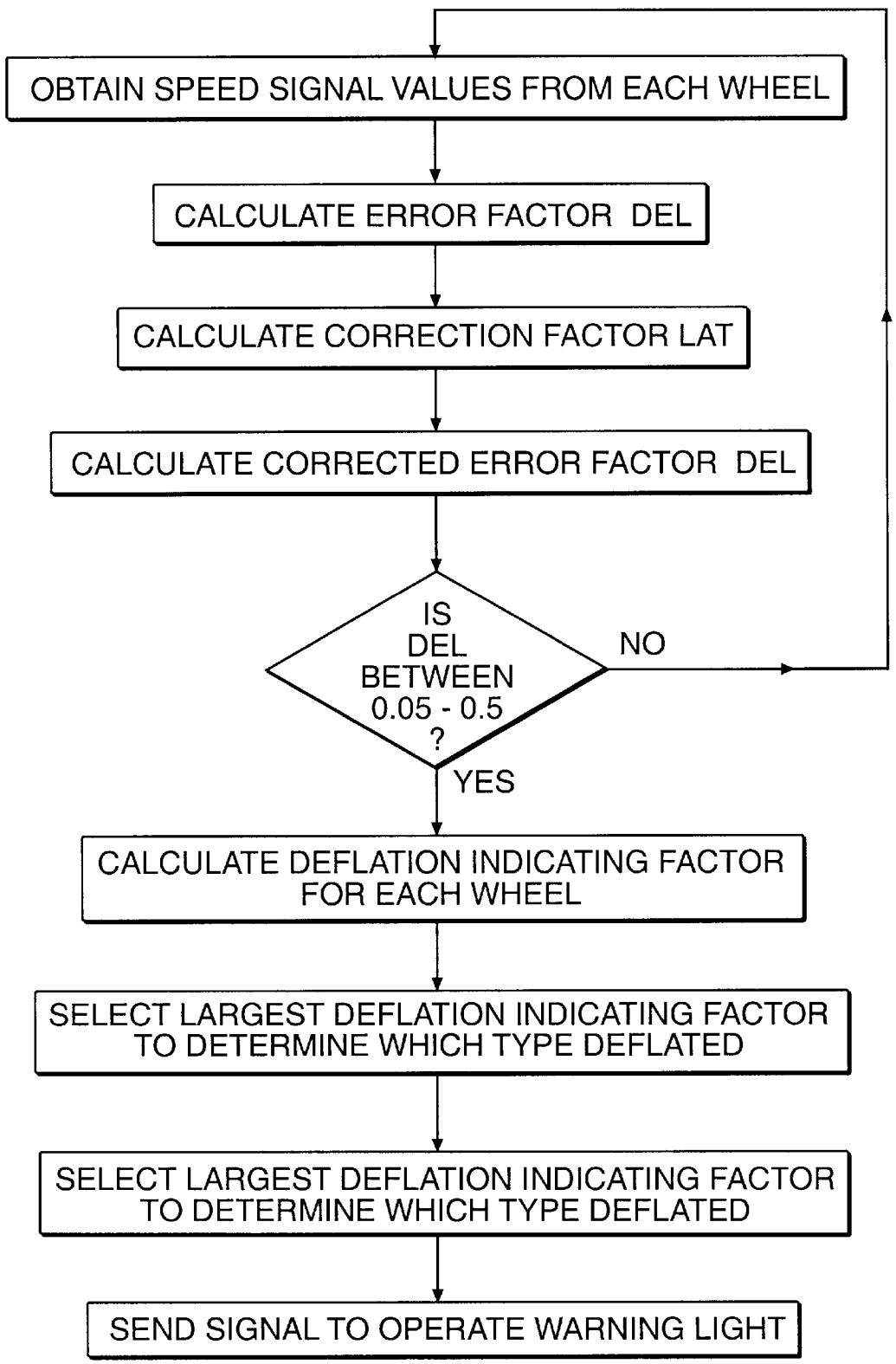
FIG. 2 is a schematic diagram showing the sequence of a computations used to determine if a deflated tire exists and decide which one is deflated.

The sequence of operations used in this computation is shown schematically in FIG. 2.

The first operation in the method of the invention is to calculate from the actual wheel speed values C1–C4 an error value DEL' where $$DEL' = \frac{[(C1+C4)/2 - (C2+C3)/2] \times 100}{(C1+C2+C3+C4)/4}$$

However because the actual wheel speed values may be distorted duo to vehicle factors such as cornering, braking, accelerating or uneven loads which give rise to a greater effect than that caused by a tire deflation it is necessary to correct this calculated error value to remove these vehicle effects.

To correct the error value DEL' a correction factor LAT is calculated according to the magnitude of respective deciding factors MC1–MC4 for each wheel in comparison to a central deciding factor MPSD. The central deciding factor is equal to the sum for the four deciding factors MC1–MC2 multiplied by a centralising constant K which in this embodiment is selected to be 0.25025. The value of the correction factor LAT is then calculated depending on which if any of the four deciding factors MC1–MC4 is greater in magnitude than the central deciding factor MPSD as follows:

if

MC1 or MC2>MPSD then $$LAT=2\times(C3-C4)\times(C1+C2+C3+C4)$$

or if

MC3 or MC4>MPSD then $$LAT=2\times(C1-C2)\times(C1+C2+C3+C4)$$

otherwise $$LAT=(C1+C3-C2-C4)\times(C1+C2+C3+C4)$$

Figure 3:
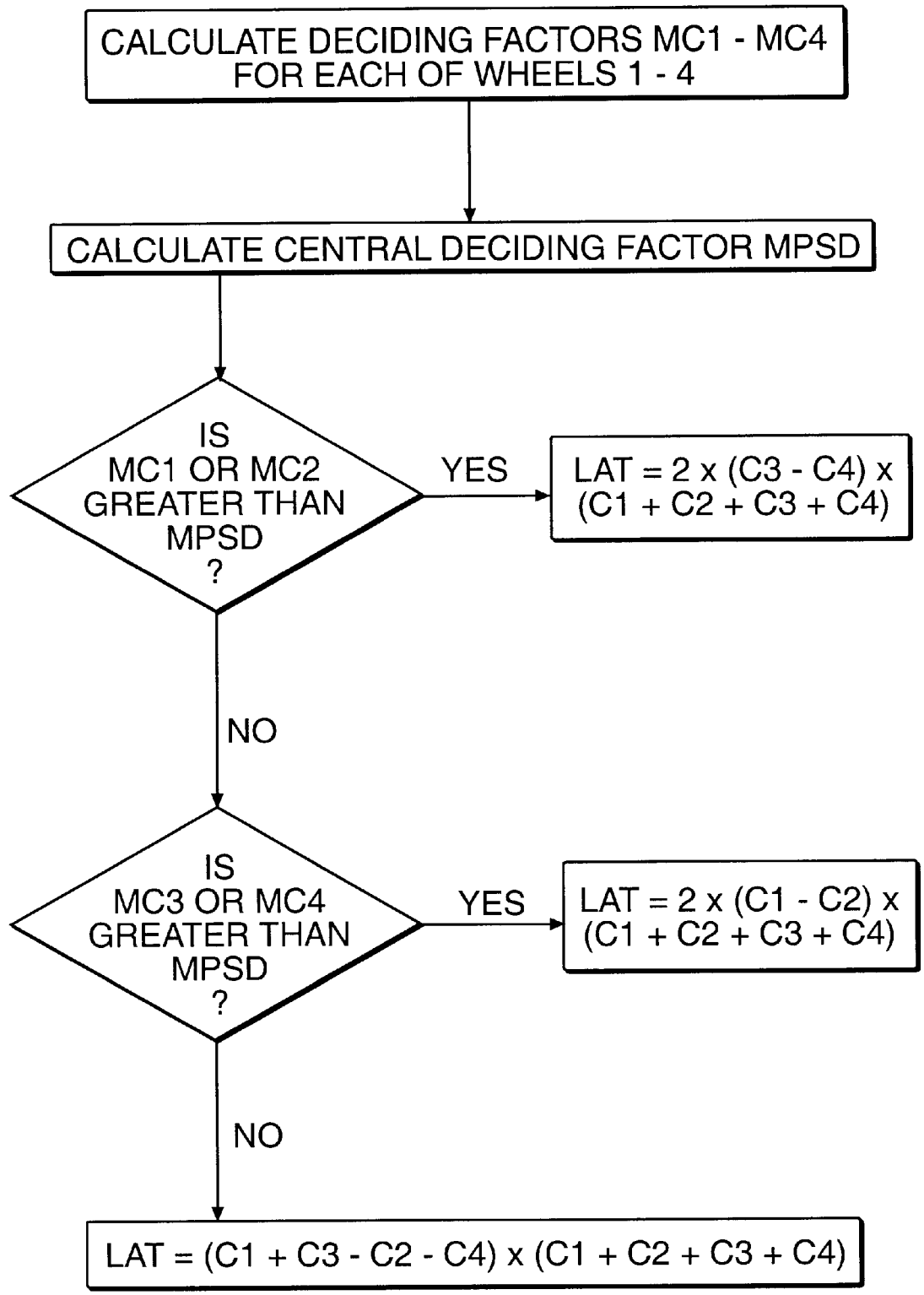
FIG. 3 is a schematic diagram showing the sequence of computations used in determining the correction factor LAT.

This sequence of operations is shown in FIG. 3.

The calculated error value DEL' is then corrected to remove vehicle effects to give a corrected error value DEL according to the following equation corrected error factor $DEL$=error factor $DEL'-LAT\times A$ wherein A is a vehicle related constant which allows for vehicle factors such as the track and other dimensions of the vehicle and characteristics of the suspension particularly in relation to side-to-side tilt. The value of this constant A for a particular vehicle may be determined by experiment. Values of constant A which have been established for cars include $+1.3\times10^{-7}$ for a Jaguar XJ6, $-0.6\times10^{-7}$ for a Peugeot 405 and $-2.0\times10^{-7}$ for an Audi 100.

Having calculated the corrected error value DEL the central processing unit 10 then decides if the value of DEL is in the range of 0.05 to 0.5 which indicates the presence of a deflated tire.

Values of DEL below 0.05 are the result of minor statistical variation in the amounts from each wheel whereas values of DEL greater than 0.5 indicate a relatively uncommon occurrence such as wheel spin or a locked wheel and are greater than the effect of a punctured tire.

If the central processing unit 10 finds that the corrected error value is between 0.05 and 0.5 then the method of the invention moves on to the next stage which is to determine which tire is deflated. Otherwise the system continues to monitor wheel speeds.

To determine which tire is deflated the central processing unit 10 calculates for each wheel a deflation indicating factor IMC1–IMC4. These factors are calculated according to the following procedure:

$$IMC1=C1$$

if the first deciding factor (MC1) is greater than the central deciding factor (MPSD) then $$IMC2=C2/[((C4/C3)/2)+0.5]$$

$$IMC3=C3/[((C4/C2)/2)+0.5]$$

$$IMC4=C4/[[((C4/C3)/2)+0.5]\times[((C4/C2)/2)+0.5]];$$

if the second deciding factor (MC2) in greater than the central deciding factor (MPSD) then $$IMC2=C2/[((C4/C3)/2)+0.5]$$

$$IMC3=C3/[((C3/C1)/2+0.5]$$

$$IMC4=C4/[[((C4/C3)/2)+0.5]\times[((C3/C1)/2+0.5)]]$$

if the third deciding factor (MC3) is greater than the central deciding factor (MPSD) then $$IMC2=C2/[((C2/C1)/2)+0.5]$$

$$IMC3=C3/[((C4/C2)/2)+0.5]$$

$$IMC4=C4/[[((C2/C1)/2)+0.5]\times[((C4/C2)/2)+0.5]];$$

if the fourth deciding factor (MC4) is greater than the central deciding factor (MPSD) then $$IMC2=C2/[((C2/C1)/2)+0.5]$$

$$IMC3=C3/[((C3/C1)/2)+0.5]$$

$$IMC4=C4/[[((C2/C1)/2)+0.5]\times[((C3/C1)/2)+0.5]];$$

or if none of the deciding factors (MC1, MC2, MC3, MC4) is greater than the central deciding (MPSD) factor then $$IMC2=C2/[(((C2+C4)/(C1+C3))/2)+0.5]$$

$$IMC3=C3/[(((C3+C4)/(C1+C2))/2)+0.5]$$

$$IMC4=C4/[[(((C3+C4)/(C1+C2))/2)+0.5]\times[(((C2+C4)/C1+C3))/2)+0.5]].$$

Thus having obtained a deflation indicating factor for each of the four wheels the central processing unit compares these to determine which wheel has the factor of the largest magnitude. A signal is then sent to operate the indicator light corresponding to that wheel in order to alert the driver that the tire concerned has deflated. In a preferred arrangement the warning signal is only sent after three sets of deflation indicating factors, calculated from successive sets of wheel speed data, all indicate that a particular tire is deflated.

While the above embodiment has illustrated the method of the invention using the signal data from a multi-toothed wheel system typically producing 48 or 96 pulses per wheel revolution the invention can equally be used with other wheel speed sensing systems. For example the method may be used with a simple system which uses a single pulse per revolution to compute the time period for one rotation of each wheel, in which case it will be necessary to multiply the wheel speeds by a constant factor to obtain data in the necessary form.

Having now described my invention what I claim is:

1. A method of detecting a deflated tire on a vehicle comprising the steps of:

rotating each tire of the vehicle;

providing one wheel speed sensor for each of the tires;

detecting the angular velocity speed of the tires by the wheel speed sensors;

comparing the rolling radii of the tires by means of comparing angular velocity speed signals from wheel speed sensors characterized by calculating an error value (DEL') where $$DEL'=\frac{[(C1+C4)/2-(C2+C3)/2]\times 100}{(C1+C2+C3+C4)/4}$$

where C1, C2, C3 and C4 are angular velocity values for left-hand front, right-hand front, left-hand rear and right-hand rear wheels of the vehicle, respectively, determining a correction factor (LAT), calculating a corrected error value (DEL) where $$DEL=DEL'-LAT\times A$$

wherein A is a vehicle related constant, and operating a tire warning indicator provided in the vehicle to indicate that at least one tire is deflated when the magnitude of the corrected error value (DEL) is sensed in the range 0.05 to 0.5, wherein the correction factor (LAT) is selected by calculating from the angular velocity values C1, C2, C3 and C4 respective first, second, third and fourth deciding factors (MC1, MC2, MC3, and MC4) where $MC1=C1$ $MC2=C2/[(C2+C4)/(C1+C3)]$ $MC3=C3/[(C3+C4)/(C1+C2)]$ $MC4=C4/[[(C2+C4)/(C1+C3)]\times[(C3+C4)/(C1+C2)]]$, then summing the first, second, third and fourth deciding factors and multiplying this sum by a centralizing constant (K) to give a central deciding factor (MPSD) and selecting the correction factor (LAT) as follows, if the first or second deciding factor (MC1 or MC2) is greater than the central deciding factor (MPSD) then $LAT=2\times(C3-C4)\times(C1+C2+C3+C4)$, if the third or fourth deciding factor (MC3 or MC4) is greater than the central deciding factor (MPSD) then $LAT=2\times(C1-C2)\times(C1+C2+C3+C4)$, or if none of the deciding factors (MC1, MC2, MC3 or MC4) is greater than the central deciding factor (MPSD) then $LAT=(C1+C3-C2-C4)\times(C1+C2+C3+C4)$.

2. The method of detecting a deflated tire according to claim 1 wherein the centralising constant (K) has a value in the range 0.250125 to 0.250625.

3. The method of detecting a deflated tire according to claim 1 wherein the centralising constant (K) has a value of 0.25025.

4. The method of detecting a deflated tire according to claim 1 wherein a deflation indicating factor (IMC1, IMC2, IMC3, IMC4) is calculated for each wheel respectively and the wheel having the numerically greatest deflation indicating factor is indicated as deflated, where the deflation indicating factors are calculated as follows:

$IMC1=C1$, then if the first deciding factor (MC1) is greater than the central deciding factor (MPSD) then $IMC2=C2/[((C4/C3)/2)+0.5]$ $IMC3=C3/[((C4/C2)/2)+0.5]$ $IMC4=C4/[[((C4/C3)/2)+0.5]\times[((C4/C2)/2)+0.5]]$;

if the second deciding factor (MC2) is greater than the central deciding factor (MPSD) then $IMC2=C2/[((C4/C3)/2)+0.5]$ $IMC3=C3/[((C3/C1)/2)+0.5]$ $IMC4=C4/[[((C4/C3)/2)+0.5]\times[((C3/C1)/2)+0.5]]$;

if the third deciding factor (MC3) is greater than the central deciding factor (MPSD) then $IMC2=C2/[((C2/C1)/2)+0.5]$ $IMC3=C3/[((C4/C2)/2)+0.5]$ $IMC4=C4/[[((C2/C1)/2)+0.5]\times[((C4/C2)/2)+0.5]]$;

if the fourth deciding factor (MC4) is greater than the central deciding factor (MPSD) then $IMC2=C2/[((C2/C1)/2)+0.5]$ $IMC3=C3/[((C3/C1)/2)+0.5]$ $IMC4=C4/[[((C2/C1)/2)+0.5]\times[((C3/C1)/2)+0.5]]$;

or if none of the deciding factors (MC1, MC2, MC3, MC4) in greater than the central deciding (MPSD) factor then $IMC2=C2/[(((C2+C4)/(C1+C3))/2)+0.5]$ $IMC3=C3/[(((C3+C4)/(C1+C2))/2)+0.5]$ $IMC4=C4/[[(((C3+C4)/(C1+C2))/2)+0.5]\times[(((C2+C4)/C1+C3))/2)+0.5]]$ 5. The method of detecting a deflated tire according to claim 1 wherein the tire warning indicator is operated when the magnitude of the corrected error value (DEL) is sensed in the range 0.1 to 0.3.

6. The method of detecting a deflated tire according to claim 1 wherein the value of the vehicle related constant (A) is in the range −2.0E-7 to +2.0E-7.

7. The method of detecting a deflated tire according to claim 1 wherein the value of the vehicle related constant (A) is −2.0E-7.

8. The method of detecting a deflated tire according to claim 1 wherein the value of the vehicle related constant (A) is −0.6E-7.

9. The method of detecting a deflated tire according to claim 1 wherein the value of the vehicle related constant (A) is +1.3E-7.

10. A deflated tire detector comprising:

a plurality of speed sensors each provided for a corresponding tire of a plurality of tires on a vehicle, each of said speed sensors outputting an angular velocity of said corresponding tire;

means for comparing rolling radii of said tires including means for calculating an error signal (DEL') where $DEL'=[(C1+C4)/2-(C2+C3)/2]\times100/(C1+C2+C3+C4)/4$ where C1, C2, C3 and C4 are angular velocity output by said speed sensors for left-hand front, right-hand front, left-hand rear and right-hand rear tires of the vehicle respectively, means for determining a correction factor (LAT), means for determining a corrected error signal (DEL) where $DEL=DEL'-(LAT\times A)$ where A is a vehicle related constant, means for determining when a magnitude of said corrected error signal (DEL) is between 0.05 and 0.5 and for outputting a warning signal in response thereto; and a warning indicator, receiving said warning signal and providing a warning in accordance therewith, wherein said means for determining said correction factor (LAT) includes:

means for calculating, from the four angular velocity values C1, C2, C3 and C4, respective first, second, third and fourth deciding factors (MC1, MC2, MC3, MC4) where $MC1=C1$ $MC2=C2/[(C2+C4)/(C1+C3)]$ $MC3=C3/[(C3+C4)/(C1+C2)]$ $MC4=C4/[[(C2+C4)/(C1+C3)]\times[(C3+C4)/(C1+C2)]]$;

means for summing the four deciding factors and outputting a sum;

means for multiplying said sum by a centralizing constant K to give a central deciding factor (MPSD); and means for selecting the correction factor (LAT) as follows:

if the first or second deciding factor (MC1 or MC2) is greater than the central deciding factor (MPSD) then $$LAT=2\times(C3-C4)\times(C1+C2+C3+C4),$$

if the third or fourth deciding factor (MC3 or MC4) is greater than the central deciding factor (MPSD) then $$LAT=2\times(C1-C2)\times(C1+C2+C3+C4),$$

or if none of the deciding factors (MC1, MC2, MC3 or MC4) is greater than the central deciding factor (MPSD) then $$LAT=(C1+C3-C2-C4)\times(C1+C2+C3+C4).$$

11. The deflated tire detector according to claim 10, wherein said warning indicator is a light in the vehicle.

12. The deflated tire detector according to claim 11, wherein said warning indicator comprises a plurality of warning indicators, corresponding to said plurality of speed sensors.

13. The deflated tire detector according to claim 12, wherein each of said speed sensors comprises a toothed wheel device.

14. The deflated tire detector according to claim 10, wherein centralizing constant K has a value in the range 0.250125 to 0.250625.

15. The deflated tire detector according to claim 10, wherein centralizing constant K has a value of 0.25025.

16. The deflated tire detector according to claim 10, further comprising means for calculating a deflation indicating factor (IMC1, IMC2, IMC3, IMC4) for each wheel respectively and means for indicating the wheel having the numerically greater deflation indicating factor as being deflated, where the calculation of the deflation indicating factors comprises:

$$IMC1=C1,$$

then if the first deciding factor (MC1) is greater than the central deciding factor (MPSD) then $$IMC2=C2/[((C4/C3)/2)+0.5]$$

$$IMC3=C3/[((C4/C2)/2)+0.5]$$

$$IMC4=C4/[[((C4/C3)/2)+0.5]\times[((C4/C2)/2+0.5]];$$

if the second deciding factor (MC2) is greater than the central deciding factor (MPSD) then $$IMC2=C2/[((C4/C3)/2)+0.5]$$

$$IMC3=C3/[((C3/C1)/2)+0.5]$$

$$IMC4=C4/[[((C4/C3)/2)+0.5]\times[((C3/C1)/2)+0.5]];$$

if the third deciding factor (MC3) is greater than the central deciding factor (MPSD) then $$IMC2=C2/[((C2/C1)/2)+0.5]$$

$$IMC3=C3/[((C4/C2)/2)+0.5]$$

$$IMC4=C4/[[((C2/C1)/2)+0.5]\times[((C4/C2)/2)+0.5]];$$

if the fourth deciding factor (MC4) is greater than the central deciding factor (MPSD) then $$IMC2=C2/[((C2/C1)/2)+0.5]$$

$$IMC3=C3/[((C3/C1)/2)+0.5]$$

$$IMC4=C4/[[((C2/C1)/2)+0.5]\times[((C3/C1)/2)+0.5]];$$

or if none of the deciding factors (MC1, MC2, MC3, MC4) is greater than the central deciding (MPSD) factor then $$IMC2=C2/[(((C2+C4)/(C1+C3))/2)+0.5]$$

$$IMC3=C3/[(((C3+C4)/(C1+C2))/2)+0.5]$$

$$IMC4=C4/[[(((C3+C4)/(C1+C2))/2)+0.5]\times[(((C2+C4)/(C1+C3))/2)+0.5]].$$

17. The deflated tire detector according to claim 10 wherein the value of the vehicle related constant A is in the range −2.0E-7 to +2.0E-7.

* * * * *